United States Patent [19]

Swanson

[11] Patent Number: 4,498,692

[45] Date of Patent: Feb. 12, 1985

[54] PENETRATION SEAL

[76] Inventor: Mervin D. Swanson, 1625 - 13th Ave. NW., Puyallup, Wash. 98371

[21] Appl. No.: 529,149

[22] Filed: Sep. 2, 1983

[51] Int. Cl.³ .............................................. F16L 39/00
[52] U.S. Cl. ...................................... 285/20; 285/158; 285/161
[58] Field of Search ................... 285/161, 158, 19, 20, 285/159

[56] References Cited

U.S. PATENT DOCUMENTS

| | | | |
|---|---|---|---|
| 1,507,647 | 9/1924 | Williams | 285/158 X |
| 2,118,672 | 5/1938 | Green | 285/158 X |
| 2,464,332 | 3/1949 | Maund et al. | 285/158 |
| 2,508,655 | 5/1950 | Silverman | 285/19 X |
| 4,250,348 | 2/1981 | Kitagawa | 285/161 X |

FOREIGN PATENT DOCUMENTS 1187059  9/1959  France ................................ 285/158

Primary Examiner—Thomas F. Callaghan
Attorney, Agent, or Firm—Gregory W. Moravan

[57] ABSTRACT

A reusable penetration seal for sealing a hole in a wall through which a conduit passes, without the need for the use of gaskets or gasketing or sealing materials. The penetration seal comprises a hollow penetration sleeve having a head at one end with an inwardly directed circular knife edge for sealing against the wall, and having a threaded shank; a compression nut for securing the penetration sleeve to the wall and for forcing the knife edge firmly against the wall to form a bite seal therebetween; a ferrule for sealing the conduit which passes through the hollow penetration sleeve; and a seal nut for being threaded to the end of the shank of the penetration seal to compress and seal the ferrule, conduit and penetration sleeve together in a compression seal. If the penetration seal is used to seal a conduit hole in a double wall construction having inner and outer walls, a compression sleeve may be provided to transfer loading from the compression nut to the wall against which the head of the penetration sleeve bears, to help prevent distortions of said wall which might otherwise tend to interfere with said bite seal.

1 Claim, 2 Drawing Figures

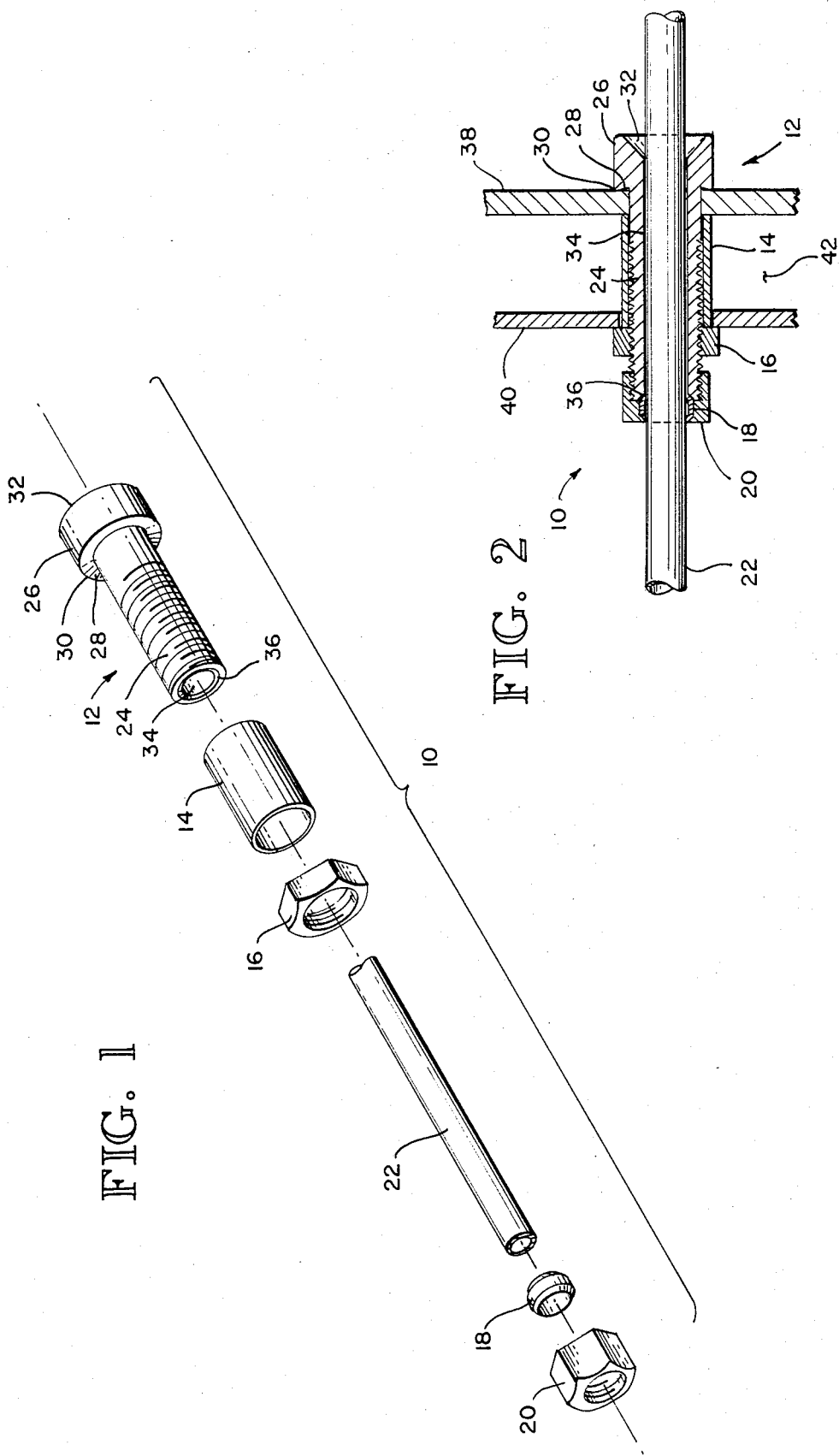

PENETRATION SEAL

FIELD OF THE INVENTION

The present invention relates to seals, and more particularly, it relates to a penetration seal.

SUMMARY OF THE INVENTION

In various fields, a frequently encountered problem is how to penetrate a wall, such as with conduit, while preventing leakage of fluids through the wall in either direction through the hole in the wall provided for the conduit. The term fluid is used in its broad sense of including both gasses and liquids.

Accordingly, some of the primary objects of the present invention are to provide a penetration seal which will quickly, economically, and reliably solve this problem, without the need for conventional gaskets or gasketing material which may age and eventually fail, causing undesired leakage through the wall around the conduit.

In basic form, the invention comprises four parts —a hollow penetration sleeve having a head at one end with an inwardly directed circular knife edge for sealing against the wall, and having a threaded shank; a compression nut for securing the penetration sleeve to the wall and for forcing the knife edge firmly against the wall to form a bite seal between the wall and the knife edge; a ferrule for sealing the conduit which passes through the hollow penetration sleeve; and a seal nut for being threaded to the end of the shank of the penetration sleeve to compress and seal the ferrule, conduit and penetration sleeve together in a compression seal.

If the penetration seal is used to seal a conduit hole in a double wall construction having inner and outer walls, a compression sleeve may be provided to transfer loading from the compression nut to the wall against which the head of the penetration sleeve bears, to help prevent distortions of said wall which might otherwise tend to interfere with said bite seal.

The foregoing is but a brief summary of some of the objects, features, advantages and characteristics of the present invention, since these and other objects, features, advantages and characteristics will be directly or inherently disclosed to those of ordinary skill in the art to which the present invention pertains in view of the disclosures herein.

BRIEF DESCRIPTION OF THE FIGURES

FIG. 1 is an exploded perspective view of the present invention; and

FIG. 2 is a longitudinal cross sectional view thereof shown installed in a wall and carrying a conduit.

DETAILED DESCRIPTION OF THE PREFERRED EMBODIMENTS

Referring now to the figures, the invention is shown generally designated at 10. It comprises a penetration sleeve 12, a compression sleeve 14, a compression nut 16, a ferrule 18 and a seal nut 20. The conduit 22 does not form a part of the invention.

The penetration sleeve 12 has a threaded shank 24 and a head 26. The head 26 has an inner reverse bevel 28 which produces a circular knife edge 30; and has an outer reverse bevel 32. The penetration sleeve 12 is hollow and defines a longitudinal internal bore 34, while the inner end of the shank 24 terminates in an inner chamfer 36.

The compression sleeve 14 is a hollow, tubular element and has an internal diameter sized larger than the shank 24 of the penetration sleeve 14, and has an outer diameter preferably sized about as large as the maximum diameter of the head 26 of the penetration sleeve 14.

Ferrule 18 and seal nut 20 are of any conventional construction.

All of the parts mentioned above are preferably formed of metal, to withstand the substantial temperatures and/or pressures, and the possibly corrosive environment which the invention 10 may encounter during use. The selection of appropriate materials, depending on the temperatures, pressures, and environments anticipated during use, will be readily apparent to those of ordinary skill in the art. However, it should be noted that the knife edge 30 of the penetration sleeve 12 should be formed of a metal harder than the inner wall 38 against which it will seal, for proper operation.

By way of non-limiting example, if the invention 10 was designed to be used in a home type wood burning stove, the penetration sleeve 12 could be formed from stress proof shafting the compression sleeve 14 could be formed from Mild Steel tubing the compression nut 16 could be formed from steel; and the ferrule 18 and seal nut 20 could be formed from brass.

Referring now to FIG. 2, let us assume, by way of non-limiting example, that the invention 10 is to seal the penetration by conduit 22 of a device having an inner wall 38, an outer wall 40, and insulation 42 therebetween. Walls 38, 40 and insulation 42 form no part of the present invention. It is understood that the invention 10 can be readily sized to be used to seal one or more walls, walls of various thicknesses, and walls with various spacings therebetween.

In order to install the invention 10, first a hole is bored in inner wall 38, the hole preferably being sized just slightly larger than the shank 24 of the penetration sleeve 12. Then a hole is bored in outer wall 40 in axial alignment with the hole in wall 38, and is sized just slightly larger than the compression sleeve 14. The insulation 42 between the holes in the walls 38, 40 is removed.

Then the shank 24 of the penetration sleeve 12 is inserted through the holes in walls 38, 40; and the compression sleeve 14 is inserted over the shank 24 through the hole in wall 40 until its inner end contacts the outside of inner wall 38, as seen in FIG. 2. Note sleeve 14 is preferably sized so it extends just past the outer surface of outer wall 40, when installed.

Then the compression nut 16 is firmly tightened down, until the knife edge 30 of the head of the penetration sleeve 12 cuts into the surface of the inner wall 38, to effecuate a fluid tight bite seal therebetween, without the need to use any gaskets or sealing materials.

Note that since the compression sleeve 14 extends past the outer wall 40, the loading from the compression nut 16 is not carried by the outer wall 40, which typically is formed from relatively thin, non-load bearing, sheet metal or other material. Instead, the loading from the compression nut 16 is carried by the compression sleeve 14 to the inner wall 38 which, in turn, supports the head 26 and knife edge 30 of the penetration sleeve 12. This arrangement not only prevents undesireable collapse or deformation of the outer wall 40, but also prevents undesireable collapse or deformation of the inner wall 38.

Naturally, the compression sleeve 14 could be eliminated if the walls 38, 40 were sturdy enough to bear the loading by the compression nut 16 and penetration seal 38 without an unacceptable amount of collapse or deformation. Collapse or deformation of the inner wall 38 is particularly to be avoided if it progresses to the point where it interferes with the bite seal between the inner wall 38 and knife edge 30 of penetration sleeve 12.

Also, of course, the compression sleeve 14 is not needed if only a single wall is being sealed. In such case the shank 24 of the penetration seal would be threaded such that the compression nut 16 would bear directly against the wall being sealed.

After the penetration sleeve 12 has been mounted as was described above, the conduit 22 is inserted through the bore 34 of the penetration sleeve 12; the ferrule 18 and seal nut 20 are slipped over the conduit 22; and the seal nut 20 is screwed tightly to the shank 24 of the penetration sleeve 12 until a good compression seal is formed between the conduit 22, ferrule 18, and penetration sleeve 12. The chamfer 36 on the end of shank 24 of penetration sleeve 12 aids in sealing against the ferrule 18.

Note that the conduit 22 and wall 38 are now completely sealed. The bite seal between the wall 38 and knife edge 30 of the penetration sleeve 12 prevents any leakage of fluids therebetween; and the compression seal between the conduit 22, ferrule 18 and penetration sleeve 12 prevents any leakage of fluids which may enter the bore of penetration sleeve 12 around conduit 22.

The outer bevel 32 on the head 26 of penetration sleeve 12 is designed to permit the bending of the conduit 22 as it exits the penetration sleeve 24, should this be desired. If no such bending is desired, the bevel 32 could be eliminated.

With reference to FIG. 2, it is noted that the inner wall 38 is the wall which would normally be expected to encounter the heat, pressure and/or adverse environment contained within wall 38, as in a wood burning stove, or in a boiler, for example; while the left hand side of wall 38, and the outer wall 40, would communicate with the normal surrounding environment. The arrangement of the invention 10 shown in FIG. 2 is preferred since any pressure contained within inner wall 38 will tend to reinforce the bite seal between knife edge 30 and the wall 38 by forcing the head 26, and thus the knife edge 30, of the penetration sleeve 12 more firmly against wall 38.

Thus, although it is not preferred for the reason expressed above, it is possible to reverse the arrangment of the invention shown in FIG. 2 so the head 26 of the penetration sleeve is adjacent outer wall 40, and its compression nut 16 adjacent the inner wall 38. In such case, of course, the bores in the walls 38, 40 would also have to be reversed. With such reversal of the invention 10, extra care or strengthening of the invention 10 may be necessary, to ensure that the pressure within the inner wall 38 does not tend to lift the head 26 and its knife edge 30 of the penetration sleeve 12 away from the wall 40, and thus interfere with the bite seal therebetween. Where the invention 10 is so reversed in a situation where double walls 38, 40 are encountered, such reversal may also be undesireable since undesired leakage of fluids from within wall 38 to between the walls 38, 40 may occur.

One of the advantages of the invention 10 is that, since it does not depend on the use of gaskets or gasketing or sealing materials, it can be easily disassembled and reassembled if it or the conduit 22 needs to be inspected or replaced.

In view of the foregoing, various further applications, modifications, adaptions and arrangements of the present invention will readily occur to those of ordinary skill in the art to which it is addressed, within the scope of the claims which are appended hereto.

What is claimed is:

1. A penetration seal kit adapted to provide a fluid tight seal for the penetration of a conduit through spaced apart first and second side wall means of a chamber; wherein said penetration seal kit comprises:

a penetration sleeve having a head at one end, a shank, and a longitudinal bore passing completely through said penetration sleeve; wherein said bore is adapted to permit the passage of said conduit therethrough; wherein said head defines a closed knife edge; and wherein said shank of said penetration sleeve is adapted to pass completely through said spaced apart first and second side wall means;

a connection means, adapted to engage said shank of said penetration sleeve outside said both of side wall means, for pulling said knife edge of said penetration sleeve firmly against one of said side wall means to form a fluid tight bite seal between said knife edge and said one of said side wall means;

a tubular compression sleeve adapted to permit the passage of said shank of said penetration sleeve therethrough; wherein said compression sleeve is adapted to extend from said connection means to said one of said side wall means to transfer loading from said connection means to said one of said side wall means to help to prevent undesireable deformation of at least one of said side wall means when said connection means pulls said knife edge firmly against said one of said side wall means; and wherein said compression sleeve has an outer diameter sized at least about as large as the diameter of said knife edge to be adapted to support said one of said side wall means beneath said knife edge to help to prevent undesired deformation of said one of said side wall means adjacent said knife edge when said connection means pulls said knife edge firmly against said one of said side wall means;

a ferrule adapted to receive said conduit adjacent one end of said shank of said compression sleeve; and a seal connection means, adapted to engage said shank of said compression sleeve, for making a firm compression seal between said conduit, said ferrule and said shank of said compression sleeve;

wherein one end of said shank of said penetration sleeve defines a chamfer adapted to engage a corresponding portion of said ferrule; and wherein, when said penetration seal kit is installed on said first and second side wall means, said head of said penetration sleeve is adapted to be located within said chamber to enable any pressure within said chamber to act against said head to tend to more firmly engage said knife edge on said head with said one of said side wall means.

* * * * *